Feb. 27, 1934. A. E. W. JOHNSON 1,948,919
TRACTOR DISK HARROW
Filed June 8, 1933 2 Sheets-Sheet 2
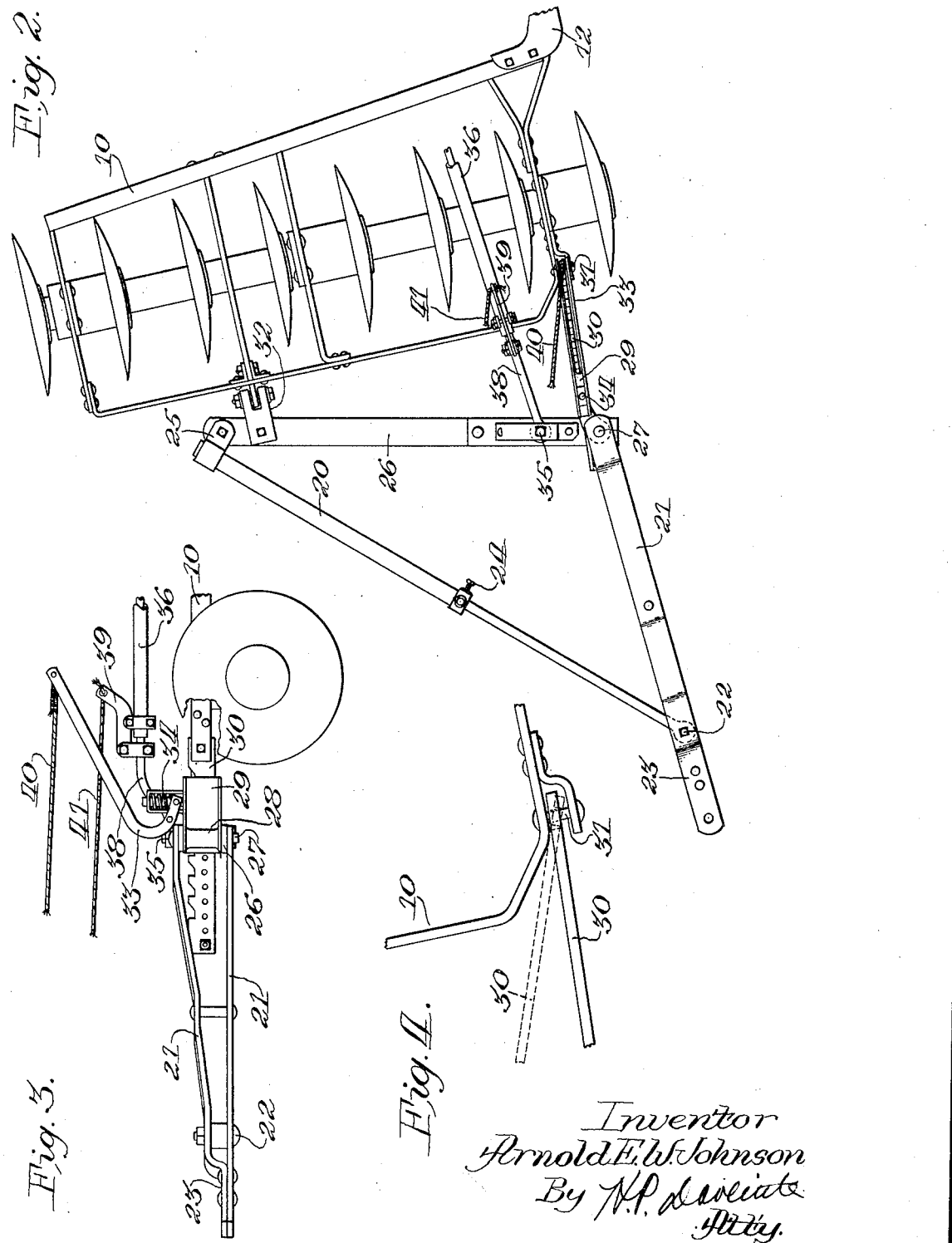
Inventor
Arnold E. W. Johnson Patented Feb. 27, 1934

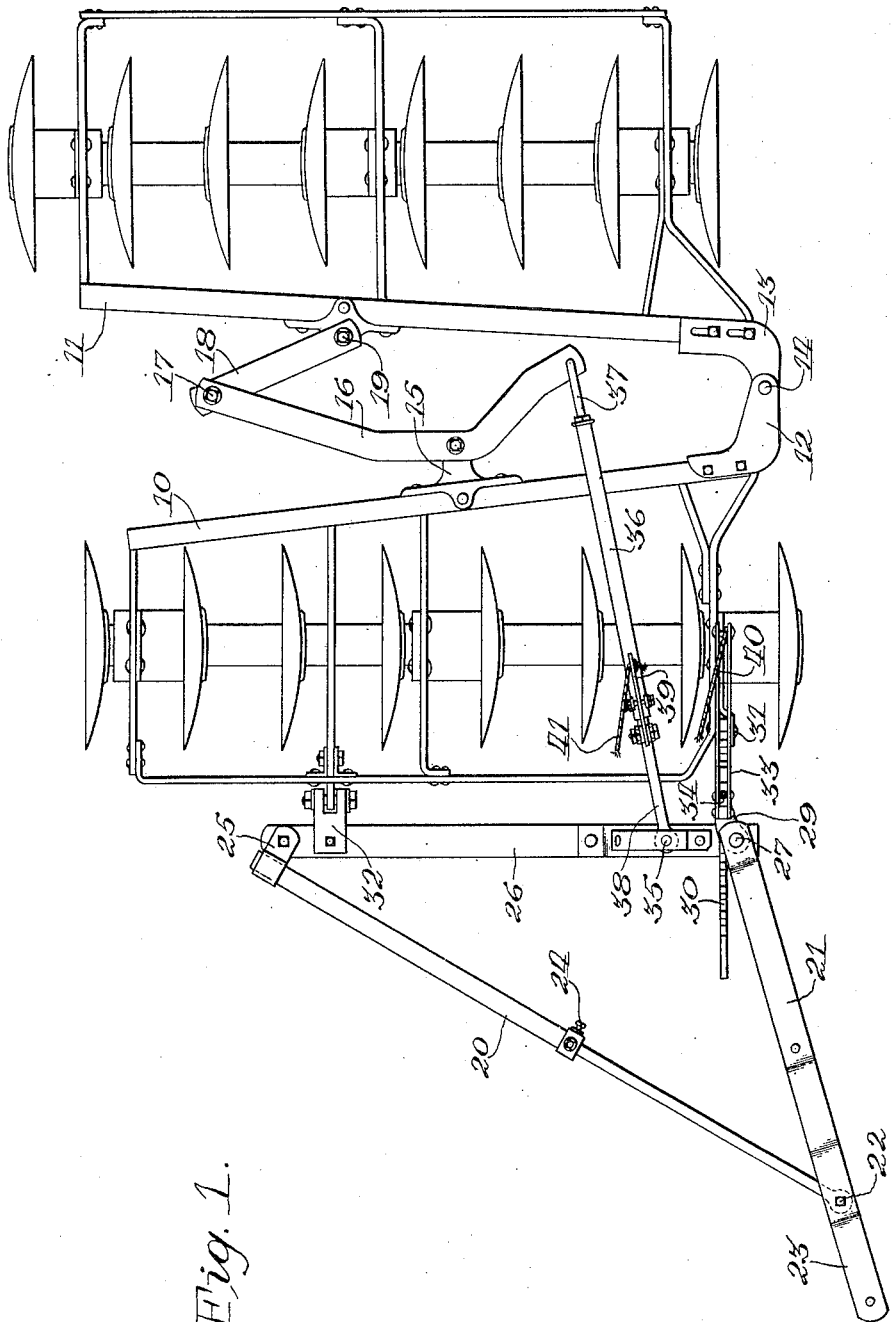

1,948,919

UNITED STATES PATENT OFFICE 1,948,919

TRACTOR DISK HARROW

Arnold E. W. Johnson, Chicago, Ill., assignor to International Harvester Company, a corporation of New Jersey Application June 8, 1933. Serial No. 674,913

5 Claims. (Cl. 55—83)

The present invention relates to disk harrows of the two-gang offset type adapted for operation behind a tractor.

The object of the invention is to provide a construction which will afford a flexible connection between the draft frame and the front frame of the harrow without interfering with the operation of the mechanisms controlling the horizontal angular movements of the gang frames through the forward and backward movements of the tractor and during turning of the tractor and harrow at the ends of a field.

The foregoing and other objects and advantages are accomplished in the preferred embodiment of the invention hereinafter described and illustrated by the accompanying drawings, where:

Figure 1 is a plan view of a tractor disk harrow embodying the invention with parts shown in the positions assumed when the draft frame and gangs are in parallel or closed position for transport;

Figure 2 is a similar view of the front half of the harrow with the draft frame shown in the position assumed when the gangs are in angled or working position;

Figure 3 is a side elevation of the portion of the harrow shown in Figure 2; and, Figure 4 is a detail of the latch bar connection to the front harrow frame.

In the present instance, the invention is disclosed as applied to a tractor disk harrow comprising a pair of disk gang frames 10 and 11, which are preferably of oblong, rectangular form and arranged in tandem relation with the longer diameters of the frames extending transversely to the direction of travel. Each frame carries a series or gang of disks and the disk gangs in the respective frames have their concave sides directed in opposite directions.

The frames are connected for horizontal angular adjustment by means of a rearwardly projecting, forked pivot bracket 12 at one end of the front frame and a bracket 13 on the rear frame, which has a forwardly projecting arm received between the fork arms of the bracket 12. A pivot pin 14 connects these arms and provides for angular movement of the gang frames about a vertical pivot at one end of the frames.

In order to effect the desired angular movement or adjustment of the disk gang frames, the rear bar of the front frame has secured to it a central pivot bracket 15, which is provided with a vertical pivot pin on which there is pivoted a horizontal lever 16. This lever is pivoted on the bracket 15 at its center and is provided with oppositely extending arms with one arm extending in the direction of the pivot between the gang frames. The opposite arm is pivotally connected at 17 to a link 18, which in turn is pivoted to a bracket on the rear frame at 19, as illustrated in Figure 1. The link 18 and the arm of the lever 16 together form a toggle-like connection between the gange frames which acts on the respective frames at points spaced laterally from the pivot 14 between the frames. Extension of the toggle will force the disk gang frames into angular relation, and contraction of the toggle will bring them into substantially parallel relation.

To effect angling and straightening of the disk gangs as desired, the front gang frame is connected to a triangular draft frame which includes converging draft members 20 and 21 pivotally connected at their converging ends at 22, forward of which point there is provided the usual clevis 23 for connecting to the draft bar of a tractor. The draft bar 20 is preferably made in two telescoping adjustable parts, which are held at desired adjustment by set screw 24, as shown, and supported on a pivot member 25 on one end of a crossbar 26. The other draft bar 21 is pivotally mounted on the other end of bar 26. The draft bar 21 is pivoted on bar 26 by means of a vertical pin 27 and sleeve 28, as illustrated in Figure 3, the sleeve 28 being positioned between the ends of upper and lower members forming the bar 21.

The sleeve 28 is formed with an elongated extension 29 having a rectangular bore, or guideway, therein tangent to the periphery of the sleeve at its inner side. The bore or guideway in the extension 29 is shaped to slidably receive a ratchet bar 30 and form a guide therefor. At its rear end this ratchet bar 30 is loosely pivoted to the end of the front gang frame on a horizontal pin 31 and is free to move vertically and also laterally, as shown in dotted lines on Figure 4. The other end of crossbar 26 is supported on the front gang frame by a pivot bracket 32 to which it is pivoted on a vertical axis, while the bracket is pivoted on a horizontal axis to the gang frame. The extension or guide 29 carries a trip lever 33 connected to a spring pressed plunger 34 which works through a suitable opening in the top of the extension 29 and engages the rearwardly facing ratchet teeth on bar 30, thereby locking the draft frame against forward swinging movement.

On the end of crossbar 26 adjacent the sleeve and guide 28, 29 there is a pivot at 35 for the forward end of a telescoping angling link, the rear end of which is connected to the end of the lever 16. The telescoping link is preferably formed of an outer tubular portion 36 secured to a terminal rod piece 37, which is in turn pivoted in an opening in the end of the lever arm 16, and an inner telescoping member 38, which slides into the tubular member 36. The members 36 and 38 are connected by a trip control latch comprising a latch arm or trip 39 pivoted between lugs fixed on the projecting end of the inner link member 38 and a complemental member secured to the tubular member 36 and provided with a transverse pin adapted to be engaged by a notch in the lower edge of the latch member 39. When the trip or latch 39 is engaged with the pin, the telescopic link will be locked against extension, while release of the latch will permit members 36 and 38 of the link to extend. The latch lever 33 and rack bar 30 controlling the swinging movement of the draft frame is controlled by a pull rope 40, while another pull rope 41 controls the latch member 39. By this arrangement, the operator from his station on the tractor can control either latch.

The construction described provides a draft angled harrow in which the tandem gang frames are limited to relative angular movement horizontally and can swing as a unit vertically on pivotal connections to a horizontally adjustable draft frame.

In the operation of the harrow, the parts will first be in the positions shown in Figure 1. When it is desired to throw the gangs into angular relation, a pull on the rope 40 will lift the plunger 34 and free the draft frame from the ratchet bar 30. The draft frame will then slide on the ratchet bar under the draft power of the tractor, swinging the draft frame on the pivot member 25 and carrying with it the locked telescoping link. The pull on this link will swing the lever 16 in such a manner as to extend the toggle formed by the link 18 and arm of the lever, as the draft frame and the link assume the position of Figure 2. When it is desired to effect a right turn of the harrow after the gangs are in angular relation, the operator will pull the rope 41 to release the latch 39, after which, on turning the harrow to the right, the parts 36, 38 of the telescoping link will extend, permitting the lever 16 to swing and the gangs to assume a parallel or nearly parallel position, as described, during a right turn. When straight forward travel is resumed, the gangs will return to the angular relation originally set by forward movement of the draft member frame, and the latch member 39 will automatically reengage and again lock the telescoping link. Backing the tractor when the gangs are angled will cause the plunger 34 to ratchet over the teeth of bar 30 as the draft frame moves back, and the thrust on the telescopic link acts to straighten the gangs.

The foregoing describes the preferred embodiment of the invention, which may, however, be subject to modification within the scope of the following claims.

What is claimed is:

1. A tractor disk harrow comprising a pair of disk gang frames disposed in tandem relation, means pivotally connecting the frames for horizontal angular adjustment, a draft frame comprising forwardly converging draft bars and a transverse bar, a supporting member at each end of said transverse bar for connecting it pivotally to the front gang frame for swinging movement vertically, said transverse bar being pivoted to one supporting member on a vertical axis and having a horizontal slidable connection with the other, linkage connecting the transverse bar with the rear gang frame, and means at said slidable connection for adjustably locking the draft frame after horizontal angular movement thereof.

2. A tractor disk harrow comprising a pair of disk gang frames disposed in tandem relation, means pivotally connecting the frames for horizontal angular adjustment, a pivot bracket connected to the front gang frame on a horizontal pivot, a transversely extended draft bar pivoted to said bracket on a vertical pivot for limited horizontal movement, a forwardly extending bar horizontally pivoted on the front frame in laterally spaced relation to the pivot bracket, a guide member on said transverse member slidably receiving said bar, draft connections extending from said draft bar and adapted to be connected to a tractor, linkage pivotally connecting said draft bar with the rear gang frame, and means for controlling horizontal swinging movements of said transverse draft member.

3. A tractor disk harrow comprising a pair of disk-gang frames disposed in tandem relation, means pivotally connecting the frames for horizontal angular adjustment, and means for effecting horizontal angular adjustment of the frames on said pivotal connection comprising a draft frame having forwardly converging draft members and a transverse member, a pivot bracket connecting one end of the transverse member to one end of the front gang frame for movement about vertical and horizontal axes, a ratchet bar pivoted on the other end of the front gang frame for movement vertically and slidably mounted on the transverse member, linkage pivotally connecting the transverse member with the rear gang frame, and latch mechanism on the draft frame for engaging the ratchet bar.

4. A tractor disk harrow comprising a pair of disk-gang frames disposed in tandem relation, means pivotally connecting the frames for horizontal angular adjustment, and draft actuated means for effecting angular adjustment of the frames on said pivotal connection comprising a draft member pivoted to the forward frame for fore and aft movement and for movement about a transverse axis, latch mechanism for controlling movement of the draft member in a fore and aft direction, a lever pivoted on the rear end of the forward frame on a vertical axis, a link pivoted to one arm of said lever and to the rear frame, a telescoping link connecting the other arm of said lever and the draft member, and latch mechanism for controlling telescoping movement of the link.

5. A tractor disk harrow comprising a pair of disk-gang frames disposed in tandem relation, means pivotally connecting the frames at one end thereof for horizontal angular adjustment, a lever pivoted intermediate its ends on a vertical pivot on the rear end of the front frame, a draft frame pivotally connected to the front frame to swing vertically and horizontally including a latch controlled slidably supported guide member movable forward and backward together with the draft frame, a link comprising telescopically related parts connected to the draft frame adjacent said member with one arm of said lever, a pivotal link connection between the other arm of the lever and the rear gang frame whereby forward swinging movement of said draft frame will force the gang frames from parallel to angular relation, and latch mechanism for locking and releasing the telescoping link parts whereby angular movement of the gang frames during a right turn may take place without horizontal swinging movement of the draft frame.

ARNOLD E. W. JOHNSON.